US010916033B2

(12) United States Patent
Fletcher et al.

(10) Patent No.: US 10,916,033 B2
(45) Date of Patent: Feb. 9, 2021

(54) SYSTEM AND METHOD FOR DETERMINING A CAMERA POSE

(71) Applicant: CANON KABUSHIKI KAISHA, Tokyo (JP)

(72) Inventors: Peter Alleine Fletcher, Rozelle (AU); David Peter Morgan-Mar, Wollstonecraft (AU); Matthew Raphael Arnison, Umina Beach (AU); Timothy Stephen Mason, Macquarie Park (AU)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 16/116,704

(22) Filed: Aug. 29, 2018

(65) Prior Publication Data

US 2019/0073792 A1 Mar. 7, 2019

(30) Foreign Application Priority Data

Sep. 5, 2017 (AU) .............................. 2017225023

(51) Int. Cl.
*G06K 9/00* (2006.01)
*G06T 7/73* (2017.01)
*G01C 11/00* (2006.01)

(52) U.S. Cl.
CPC ................ *G06T 7/74* (2017.01); *G01C 11/00* (2013.01); *G06T 7/73* (2017.01); *G06T 2200/04* (2013.01);
(Continued)

(58) Field of Classification Search
CPC . G06T 2207/10024; G06T 2207/20076; G06T 2207/30244; G06T 7/74; G06T 2200/04; G06T 2207/10016; G06T 2207/10028; G06T 7/73; G01C 11/00; G01C 11/06
See application file for complete search history.

(56) References Cited

U.S. PATENT DOCUMENTS 6,438,507 B1  8/2002  Imai
7,706,633 B2  4/2010  Khamene et al.
(Continued)

OTHER PUBLICATIONS

M.Corsini, et al., "Fully Automatic Registration of Image Sets on Approximate Geometry", International Journal of Computer Vision, Aug. 2012, vol. 102, pp. 91-111.
(Continued)

*Primary Examiner* — Tom Y Lu
(74) *Attorney, Agent, or Firm* — Canon U.S.A., Inc. IP Division

(57) ABSTRACT

A system and method determining a camera pose. The method comprises receiving a first image and a second image, the first and second images being associated with a camera pose and a height map for pixels in each corresponding image, and determining a mapping between the first image and the second image using the corresponding height maps, the camera pose and a mapping of the second image to an orthographic view. The method further comprises determining alignment data between the first image transformed using the determined mapping and the second image and determining a refined camera pose based on the determined alignment data and alignment data associated with at least one other camera pose.

21 Claims, 8 Drawing Sheets

(52) U.S. Cl.
CPC ........... *G06T 2207/10016* (2013.01); *G06T 2207/10024* (2013.01); *G06T 2207/10028* (2013.01); *G06T 2207/20076* (2013.01); *G06T 2207/30244* (2013.01)

(56) References Cited

U.S. PATENT DOCUMENTS

| | | |
|---|---|---|
| 9,202,278 B2 | 12/2015 | Jin et al. |
| 9,377,413 B2 | 6/2016 | Hermary et al. |
| 9,875,424 B2 | 1/2018 | Benhimane et al. |
| 2001/0043738 A1* | 11/2001 | Sawhney ............ G01S 5/163 382/154 |
| 2012/0236119 A1* | 9/2012 | Rhee ............ G01S 3/7864 348/46 |
| 2014/0340489 A1* | 11/2014 | Medioni ............ G06T 7/75 348/50 |
| 2015/0235378 A1* | 8/2015 | Rhee ............ G06F 3/04815 345/633 |
| 2015/0332464 A1* | 11/2015 | O'Keefe ............ H04N 13/239 348/47 |
| 2016/0171703 A1* | 6/2016 | Rhee ............ G06T 7/80 382/154 |

OTHER PUBLICATIONS

Tobias Noll, et al. "Fully Automatic, Omnidirectional Acquisition of Geometry and Appearance in the Context of Cultural Heritage Preservation", Journal on Computing and Cultural Heritage (JOCCH), Feb. 2015, vol. 8, pp. 2.

Frederik Maes, et al., "Multimodality Image Registration by Maximization of Mutual Information", IEEE Transactions on Medical Imaging, Apr. 1997, vol. 16, No. 2, pp. 187-198.

Gunnar Farnebäck, "Two-Frame Motion Estimation Based on Polynomial Expansion", In Proceedings of the 13th Scandinavian Conference on Image Analysis, Springer, Gothenburg, Sweden, 2003, pp. 363-370.

Paul S. Heckbert, "Fundamentals of Texture Mapping and Image Warping", Master Thesis, CS Dept, UC Berkeley, May 1989, pp. 17-21.

Stefan Klein, et al., "Elastix: a toolbox for intensity-based medical image registration", Medical Imaging, IEEE Transactions on Jan. 2010, vol. 29, No. 1, pp. 196-205.

n

\* cited by examiner

SYSTEM AND METHOD FOR DETERMINING A CAMERA POSE

REFERENCE TO RELATED PATENT APPLICATION(S)

This application claims the benefit under 35 U.S.C. § 119 of the filing date of Australian Patent Application No. 2017225023, filed 5 Sep. 2017, hereby incorporated by reference in its entirety as if fully set forth herein.

TECHNICAL FIELD invention relates generally to photogrammetry and specifically to a system and method of determining a camera pose, in particular to refining an estimate of the pose of cameras used to capture an image of an object. The present invention also relates to an apparatus and computer readable medium for determining a camera pose.

BACKGROUND

Using photogrammetry, visible characteristics of real-world objects and scenes can be estimated by analysing photographic images of those objects and scenes. For example, photogrammetry may be used to estimate the shape and location of furniture in a room, or to assess landmarks in an aerial survey. Typically, photogrammetry relates multiple photographs to one another, making use of shared geometry to associate imaged quantities (e.g. points in a photograph) with real-world quantities (e.g. small regions on the surface of a building depicted in that photograph).

In the course of applying photogrammetry, it is useful to characterise an optical path between an image capture device (e.g. a camera sensor) and the real-world scene. Characterising the optical path can be done by determining intrinsics and extrinsics of the image capture device. Intrinsics describe the internal optical characteristics of the image capture device, such as distortion and aberrations of the lens as well as the focal length of the lens. Extrinsics describe the pose of the image capture device in the real world, namely a three-dimensional position and a three-axis rotation of the image capture device with respect to the real-world scene.

Photogrammetry systems may determine intrinsics through calibration of the image capture device(s) by photographing an object with known geometry. Checkerboards are a popular target as the corners of the marked squares occur at a regular spacing, and can be readily located in the photographs. Images captured by the image capture device(s) can then have intrinsic distortion removed by applying the inverse of the calibrated intrinsic distortion to the images.

If the image capture devices are in fixed positions, the extrinsics can also be determined using similar calibration techniques. If the image capture devices move and/or rotate, extrinsics can be determined by finding sufficient correspondences between captured photographs to allow PnP (perspective n-pose) techniques to recover the poses. Correspondences are points in different photographs that correspond to the same real-world position. Correspondences can be found by identifying local regions of different photographs that are visually similar. Visual similarity can be assessed by comparing SIFT (scale invariant feature transform) feature vectors of local regions. When a pose estimate is available, the area searched for visual similarity matches can be constrained to the area around an epipolar line segment. In some circumstances, correspondences may be difficult to determine, for example when the surface texture of the real-world object or scene is weak.

Where a three-dimensional (3D) model of the scene is available (or a 3D point cloud of the scene is available, from which a 3D model can be determined), the pose can be determined by aligning each photograph with renderings of the 3D model at various poses. The renderings can be further coloured by projecting other overlapping photographs onto the surface of the 3D model. Mutual Information is used to assess the alignment. The known Mutual Information approach relies on a 3D model or 3D point cloud being available.

One application of photogrammetry is avoiding specular reflections from an object's surface. In order to avoid specular reflections, pixels are identified that correspond to the same real-world object surface locations, as photographed from different poses. If the distance between the imaging device and the object's surface is known for each of the photographs, a corresponding orthographic projection can be determined for each photograph. The orthographic projections can be used to correct parallax in the photographs such that the same object surface positions occur at the same coordinates in the orthographic projections. Thus object surface locations as captured by different photographs can be compared to assess whether specular reflection is present.

If a real-world object or scene consists of a planar surface, then coordinates of corresponding surface locations in a pair of photographs, as photographed from different poses, are related by a homography (a mapping from a plane to another plane consistent with projective geometry). The homography can be estimated by applying random sample consensus (RANSAC) to a sparse set of local feature correspondences in overlapping images to find a planar representation. Homography decomposition techniques can be applied to estimate camera pose. The estimated camera pose can be refined using non-linear optimisation of reprojection error. In some circumstances, the local feature correspondences may be difficult to determine, for example when the surface texture of the real-world object or scene is weak.

SUMMARY

It is an object of the present invention to substantially overcome, or at least ameliorate, one or more disadvantages of existing arrangements.

One aspect of the present disclosure provides a method of determining a camera pose, the method comprising: receiving a first image and a second image, the first and second images being associated with a camera pose and a height map for pixels in each corresponding image; determining a mapping between the first image and the second image using the corresponding height maps, the camera pose and a mapping of the second image to an orthographic view; determining alignment data between the first image transformed using the determined mapping and the second image; and determining a refined camera pose based on the determined alignment data and alignment data associated with at least one other camera pose.

In another aspect, the determined mapping is an initial mapping, the alignment data is initial alignment data, and the refined camera pose is an initial refined camera pose, the method further comprising: determining a current mapping between the first image and the second image using height maps and the initial refined camera pose, the current mapping, the current mapping determined using a mapping of at least one of the first image and the second image to an orthographic view; determining current alignment data using the current mapping; and comparing the determined alignment data to the initial alignment data to determine a current refined camera pose.

In another aspect, the determined mapping is a homography matrix.

In another aspect, the determined mapping is a displacement field.

In another aspect, determining the mapping comprises: determining a first mapping from the first image to an orthographic view using the associated height map and the associated camera pose; determining a second mapping from the second image to an orthographic view using the associated height map and the associated camera pose; inverting the second mapping to determine a composition of the first and second mappings as the mapping between the first image and the second image.

In another aspect, determining alignment data comprises determining a mutual information score based on the first image, the second image and the determined mapping between the first image and the second image.

In another aspect, determining the refined camera pose is based on a constrained spatial relationship between cameras capturing the first and second images In another aspect, the alignment data is determined based on a probability of labels co-occurring in pixels of the first image transformed using the determined mapping and the second image. 9. The method according to claim 1, further comprising using the refined camera pose in stitching the first and second images.

Another aspect of the present disclosure provides a method of determining a camera pose, the method comprising: receiving a first image, a second image, each of the first and second images being associated with a corresponding height map and a camera pose; determining coordinates in a space for pixels of each of the first and second images, the coordinates being determined using the corresponding height maps and the camera pose to form an orthographic view; determining a residual mapping substantially aligning the orthographic views corresponding to the first and second images; determining a residual-corrected mapping from the first image to the second image using the camera pose and the determined residual mapping; and determining a camera pose using the residual-corrected mapping to reduce discrepancies between the orthographic views.

In another aspect, the method further comprises a step of determining a further mapping between the first image and the second image using at least one candidate camera pose, wherein the camera pose is determined using the residual-corrected mapping and the further mapping.

In another aspect, the method further comprises repeating the step of determining a further mapping for a further candidate camera pose, and determining cameras poses using the residual-corrected mapping and each of the further mappings.

In another aspect, the camera pose is determined based upon a dissimilarity measurement between the residual-corrected mapping and a mapping between the first and second images for a candidate camera pose.

In another aspect, the residual-corrected mapping relates to a homography matrix.

In another aspect, the residual-corrected mapping relates to a displacement field, the method further comprising fitting a homography to the displacement field.

In another aspect, determining the residual-corrected mapping comprises, composing the coordinates in the space for pixels of the first image, an inverse of the coordinates in the space for pixels of the second image, and the residual mapping.

In another aspect, the method further comprises selecting a candidate pose using a dissimilarity measure between the residual-corrected mapping and a mapping from the first image to the second image associated with a previous candidate camera pose; determining a further mapping from the first image to the second image using the candidate pose, wherein the further mapping is determined using a mapping of the first image to an orthographic view and a mapping of the second image to an orthographic view; and comparing the further mapping and the residual-corrected mapping to determine the camera pose.

Another aspect of the present disclosure provides a method of determining a camera pose, the method comprising: receiving a first image and a second image, the received images being associated with a camera pose and a height map for pixels in each corresponding image; determining mappings of the first image and the second image to an orthographic view using the height maps and the camera pose; determining alignment data using the first image, the second image and the determined mappings; and determining a camera pose based on the determined alignment data and a camera pose estimation quality associated with at least one other camera pose.

Another aspect of the present disclosure provides a non-transitory computer-readable medium having a program stored thereon for determining a camera pose, the program comprising: code for receiving a first image and a second image, the first and second images being associated with a camera pose and a height map for pixels in each corresponding image; code for determining a mapping between the first image and the second image using the corresponding height maps, the camera pose and a mapping of the second image to an orthographic view; code for determining alignment data between the first image transformed using the determined mapping and the second image; and code for determining a refined camera pose based on the determined alignment data and alignment data associated with at least one other camera pose.

Another aspect of the present disclosure provides apparatus configured to: receive a first image, a second image, the first and second images being associated with a height map corresponding to each image and a camera pose; determine coordinates in a space for pixels of each of the first and second images, the coordinates being determined using the corresponding height maps and the camera pose to form an orthographic view; determine a residual mapping substantially aligning the orthographic views corresponding to the first and second images; determine a residual-corrected mapping from the first image to the second image using the camera pose and the determined residual mapping; and determine a camera pose using the residual-corrected mapping to reduce discrepancies between the orthographic views.

Another aspect of the present disclosure provides a system, comprising: a camera; a memory for storing data and a computer readable medium; a processor coupled to the memory for executing a computer program, the program having instructions for: receiving a first image and a second image captured by the camera, the received images being associated with a camera pose and a height map for pixels in each corresponding image; determining mappings of the first image and the second image to an orthographic view using the height maps and the camera pose; determining alignment data using the first image, the second image and the determined mappings; and determining a camera pose based on the determined alignment data and a camera pose estimation quality associated with at least one other camera pose.

BRIEF DESCRIPTION OF THE DRAWINGS

One or more example embodiments of the invention will now be described with reference to the following drawings, in which.

DETAILED DESCRIPTION INCLUDING BEST MODE

Figure 1A:
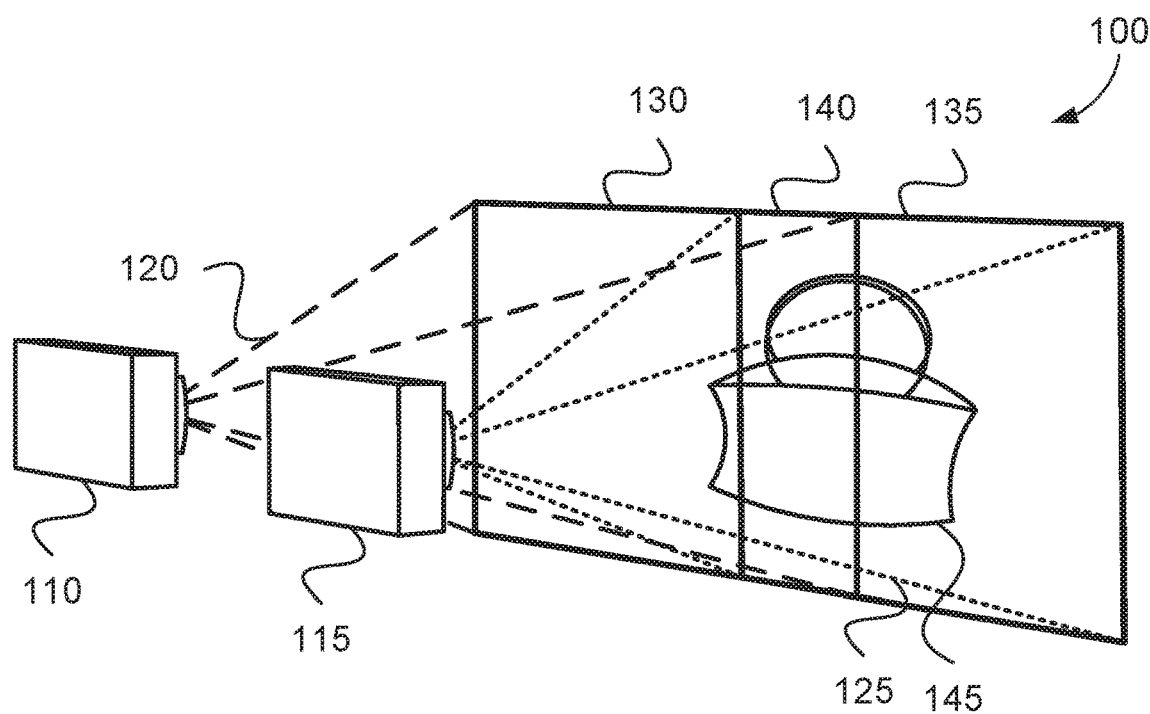
FIG. 1A is an illustration of a photogrammetry system for object scanning, whereby system cameras are geometrically related by a translation in one axis.

Where reference is made in any one or more of the accompanying drawings to steps and/or features, which have the same reference numerals, those steps and/or features have for the purposes of this description the same function (s) or operation(s), unless the contrary intention appear.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

FIG. 1A shows a first photogrammetry system 100 for capturing shape and colour information about a real-world object 145. The real-world object 145 may be substantially 2D (two-dimensional, i.e. flat, such as a wall), 3D (three-dimensional, i.e. further having variation in depth, such as a teapot) or 2.5D (i.e. having deviations about an otherwise flat surface, such as an oil painting). The first photogrammetry system 100 comprises a first camera 110 and a second camera 115. The cameras 110 and 115 can be any type of image capture device suitable for capturing an image of a scene providing colour and depth information. The cameras 110 and 115 are typically rigidly coupled to one another. The first camera 110 captures images of objects in a first frustum 120 (illustrated in FIG. 1A using longer dashes). The first camera 110 has a first plane of best focus 130 intersecting the first frustum 120. The location of the first plane of best focus 130 is governed by optical parameters of the first camera 110, particularly the focal distance. The second camera 115 similarly captures images of objects in a second frustum 125 (illustrated in FIG. 1A using shorter dashes) and has a second plane of best focus 135. Objects in both the first frustum 120 and the second frustum 125 (that is, in an overlapping region 140) are included in images captured by both cameras 110 and 115. The real-world object 145 is placed near the planes of best focus 130 and 135 of the two cameras 110 and 115. The object 145 is preferably positioned so that a relatively large portion of the object 145 is in the overlapping region 140. The two cameras 110 and 115 of FIG. 1A are geometrically related by a translation in one axis and have similar optical parameters, so the two planes of best focus 130 and 135 correspond relatively well in the overlapping region 140.

Figure 1B:
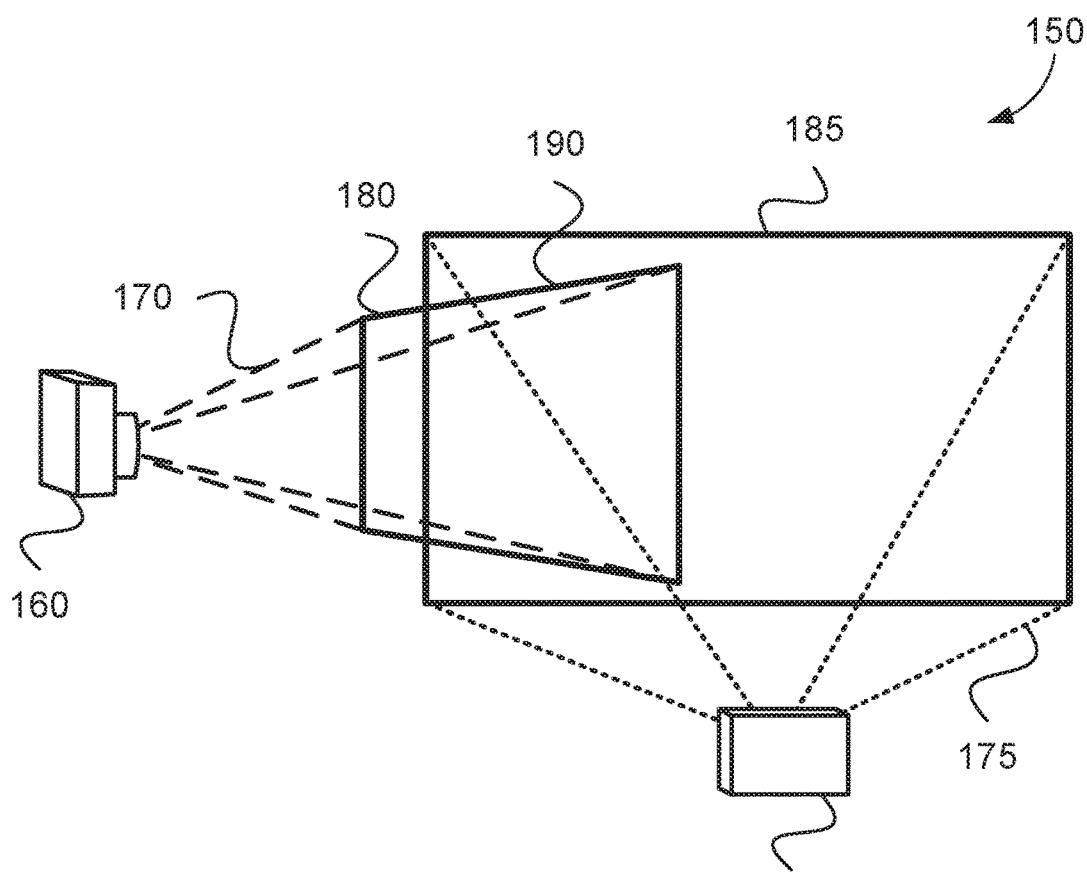
FIG. 1B is an illustration of a photogrammetry system for object scanning, whereby system cameras are geometrically related by translations in and rotations about multiple axes.

FIG. 1B illustrates a second photogrammetry system 150. Similarly to the first photogrammetry system 100, the system 150 has a first camera 160 with a first imaging frustum 170 and a first plane of best focus 180. The system 150 also includes a second camera 165 with a second imaging frustum 175 and a second plane of best focus 185. However, unlike the first photogrammetry system 100, the coupling of the cameras 160 and 165 of the system 150 allows poses varying in multiple dimensions, involving both translation and rotation. A resulting overlapping region 190 has a different shape to the overlapping region 140 of the first photogrammetry system 100 of FIG. 1A.

Although the photogrammetry systems 100 and 150 each show two cameras in use, additional cameras may be used to capture additional views or images of an object such as the object 145. Alternatively, instead of using multiple cameras to capture the views of the object, a single camera may be moved in sequence to various positions and thus capture the views in an overlapping sequence. For ease of clarity, the methods and systems described hereinafter are described with reference to two cameras, each camera located in a single position.

The cameras of both photogrammetry systems 100 and 150 are configured to capture images containing both colour information and depth information. Colour information is captured using digital photography, and depth information, being the distance from each of the cameras to a nearest surface along a ray, is captured using methods such as time-of-flight imaging, stereo-pair imaging to calculate object disparities, or imaging of projected light patterns. The depth information is represented by a spatial array of values referred to as a depth map. The depth information may be produced at a different resolution to the colour information. If the depth information is produced at a different resolution to the colour information, the depth map is interpolated to match the resolution of the colour information. If necessary, the depth information is registered to the colour information. The depth measurements are combined with a photographic image of the captured scene to form an RGB-D image. RGB denotes the colour channels Red, Green, and Blue of the photographic image, and D denotes the measured depth of the scene. The RGB-D image is formed such that each pixel of the resulting image has a paired colour value representing visible light from a viewpoint and a depth value representing the distance from the same viewpoint. Other representations and colour spaces may also be used for an image. For example, the depth information may alternatively be represented as "height" values, such as distances in front of a reference distance, stored in spatial array called a height map.

According to one arrangement of the described methods, an initial estimate of the pose of each camera (for example 110 and 115) is available. For example, the cameras may be mounted on a machine arm whose current pose can be queried within accuracy bounds. Alternatively, the cameras may be equipped with inertial sensors, such as accelerometers and gyroscopes, from which a pose estimate can be determined. Alternatively, the pose of the cameras may be pre-calibrated through physical measurements or analysis of captured images of test charts, for example using checkerboard charts.

The initial estimate of camera poses may not be highly accurate. Applications of photogrammetry such as 3D model reconstruction may be affected by undesirable artifacts such as misaligned surface features. To address the issue of inaccurate initial estimates, the initial pose estimate for each camera is refined by comparing the overlap region as captured by each camera, for example the regions 140 and 190.

Figure 7A:
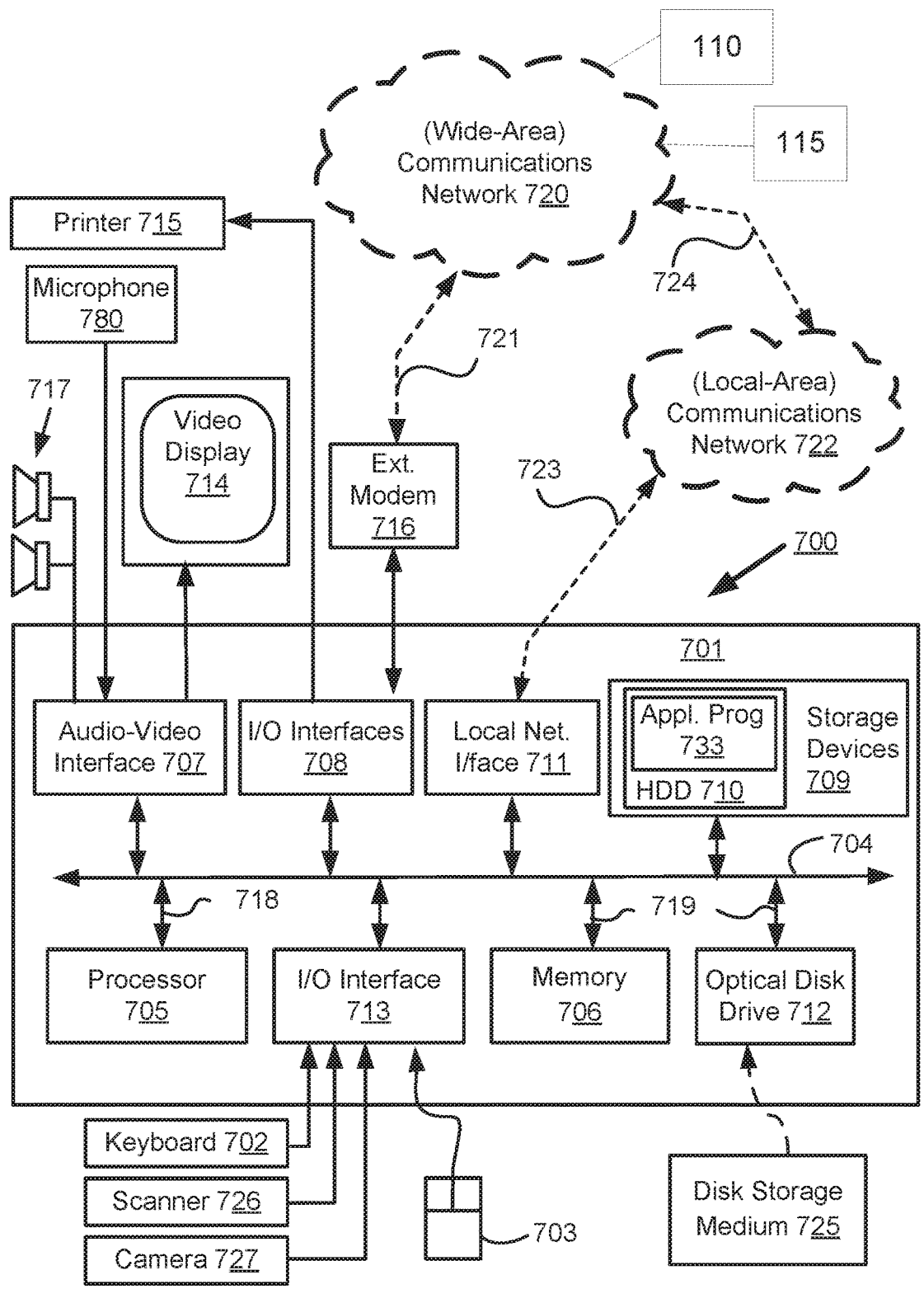
FIGS. 7A and 7B form a schematic block diagram of a general purpose computer on which the embodiments of the invention may be practised.
Figure 7B:
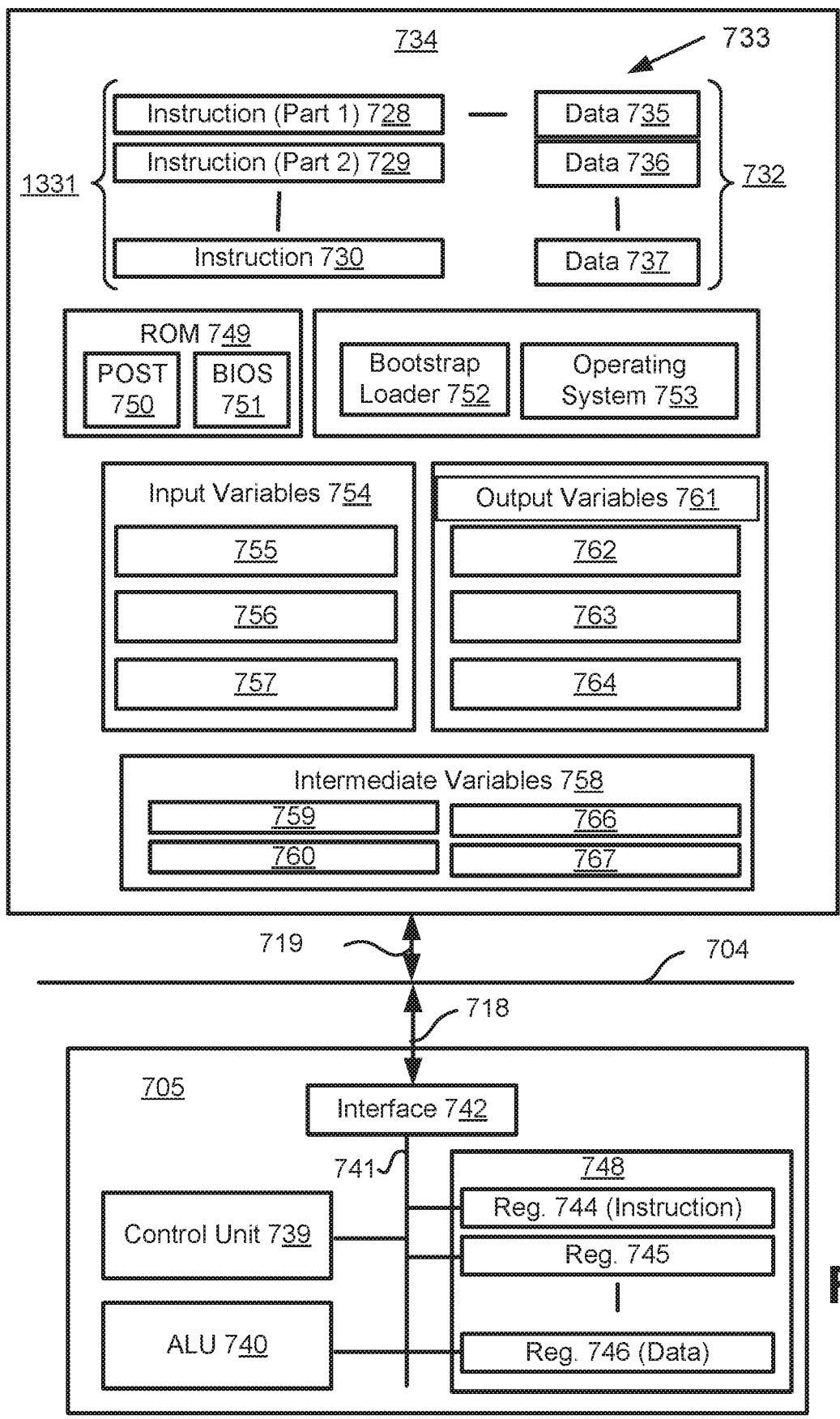

FIGS. 7A and 7B depict a general-purpose computer system 700, upon which the various arrangements described can be practiced.

As seen in FIG. 7A, the computer system 700 includes: a computer module 701; input devices such as a keyboard 702, a mouse pointer device 703, a scanner 726, a camera 727, and a microphone 780; and output devices including a printer 715, a display device 714 and loudspeakers 717. An external Modulator-Demodulator (Modem) transceiver device 716 may be used by the computer module 701 for communicating to and from a communications network 720 via a connection 721. The communications network 720 may be a wide-area network (WAN), such as the Internet, a cellular telecommunications network, or a private WAN. Where the connection 721 is a telephone line, the modem 716 may be a traditional "dial-up" modem. Alternatively, where the connection 721 is a high capacity (e.g., cable) connection, the modem 716 may be a broadband modem. A wireless modem may also be used for wireless connection to the communications network 720.

The computer module 701 is used to determine pose estimates for images capture devices such as the cameras 110 and 115. In this regard, the computer module 701 may be in communication with the cameras 110 and 115 via the network 720, as shown in FIG. 7A. The computer module 701 may be a server computer, a desktop computer or the like. Alternatively, the computer module 701 may relate to one of the cameras 110 and 115, or one of the cameras 110 and 115 may be integral to the computer module 701.

The computer module 701 typically includes at least one processor unit 705, and a memory unit 706. For example, the memory unit 706 may have semiconductor random access memory (RAM) and semiconductor read only memory (ROM). The computer module 701 also includes an number of input/output (I/O) interfaces including: an audio-video interface 707 that couples to the video display 714, loudspeakers 717 and microphone 780; an I/O interface 713 that couples to the keyboard 702, mouse 703, scanner 726, camera 727 and optionally a joystick or other human interface device (not illustrated); and an interface 708 for the external modem 716 and printer 715. In some implementations, the modem 716 may be incorporated within the computer module 701, for example within the interface 708. The computer module 701 also has a local network interface 711, which permits coupling of the computer system 700 via a connection 723 to a local-area communications network 722, known as a Local Area Network (LAN). As illustrated in FIG. 7A, the local communications network 722 may also couple to the wide network 720 via a connection 724, which would typically include a so-called "firewall" device or device of similar functionality. The local network interface 711 may comprise an Ethernet circuit card, a Bluetooth® wireless arrangement or an IEEE 802.11 wireless arrangement; however, numerous other types of interfaces may be practiced for the interface 711.

The I/O interfaces 708 and 713 may afford either or both of serial and parallel connectivity, the former typically being implemented according to the Universal Serial Bus (USB) standards and having corresponding USB connectors (not illustrated). Storage devices 709 are provided and typically include a hard disk drive (HDD) 710. Other storage devices such as a floppy disk drive and a magnetic tape drive (not illustrated) may also be used. An optical disk drive 712 is typically provided to act as a non-volatile source of data. Portable memory devices, such optical disks (e.g., CD-ROM, DVD, Blu-ray USB-RAM, portable, external hard drives, and floppy disks, for example, may be used as appropriate sources of data to the system 700.

The components 705 to 713 of the computer module 701 typically communicate via an interconnected bus 704 and in a manner that results in a conventional mode of operation of the computer system 700 known to those in the relevant art. For example, the processor 705 is coupled to the system bus 704 using a connection 718. Likewise, the memory 706 and optical disk drive 712 are coupled to the system bus 704 by connections 719. Examples of computers on which the described arrangements can be practised include IBM-PC's and compatibles, Sun Sparcstations, Apple Mac™ or like computer systems.

The methods of determining a pose of a camera may be implemented using the computer system 700 wherein the processes of FIGS. 2 to 6, to be described, may be implemented as one or more software application programs 733 executable within the computer system 700. In particular, the steps of the methods of FIGS. 2 to 6 are effected by instructions 731 (see FIG. 7B) in the software 733 that are carried out within the computer system 700. The software instructions 731 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 700 from the computer readable medium, and then executed by the computer system 700. A computer readable medium having such software or computer program recorded on the computer readable medium is a computer program product. The use of the computer program product in the computer system 700 preferably effects an advantageous apparatus for determining a pose of a camera.

The software 733 is typically stored in the HDD 710 or the memory 706. The software is loaded into the computer system 700 from a computer readable medium, and executed by the computer system 700. Thus, for example, the software 733 may be stored on an optically readable disk storage medium (e.g., CD-ROM) 725 that is read by the optical disk drive 712. A computer readable medium having such software or computer program recorded on it is a computer program product. The use of the computer program product in the computer system 700 preferably effects an apparatus for determining a pose of a camera.

In some instances, the application programs 733 may be supplied to the user encoded on one or more CD-ROMs 725 and read via the corresponding drive 712, or alternatively may be read by the user from the networks 720 or 722. Still further, the software can also be loaded into the computer system 700 from other computer readable media. Computer readable storage media refers to any non-transitory tangible storage medium that provides recorded instructions and/or data to the computer system 700 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 701. Examples of transitory or non-tangible computer readable transmission media that may also participate in the provision of software, application programs, instructions and/or data to the computer module 701 include radio or infra-red transmission channels as well as a network connection to another computer or networked device, and the Internet or Intranets including e-mail transmissions and information recorded on Websites and the like.

The second part of the application programs 733 and the corresponding code modules mentioned above may be executed to implement one or more graphical user interfaces (GUIs) to be rendered or otherwise represented upon the display 714. Through manipulation of typically the keyboard 702 and the mouse 703, a user of the computer system 700 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 717 and user voice commands input via the microphone 780.

FIG. 7B is a detailed schematic block diagram of the processor 705 and a "memory" 734. The memory 734 represents a logical aggregation of all the memory modules (including the HDD 709 and semiconductor memory 706) that can be accessed by the computer module 701 in FIG. 7A.

When the computer module 701 is initially powered up, a power-on self-test (POST) program 750 executes. The POST program 750 is typically stored in a ROM 749 of the semiconductor memory 706 of FIG. 7A. A hardware device such as the ROM 749 storing software is sometimes referred to as firmware. The POST program 750 examines hardware within the computer module 701 to ensure proper functioning and typically checks the processor 705, the memory 734 (709, 706), and a basic input-output systems software (BIOS) module 751, also typically stored in the ROM 749, for correct operation. Once the POST program 750 has run successfully, the BIOS 751 activates the hard disk drive 710 of FIG. 7A. Activation of the hard disk drive 710 causes a bootstrap loader program 752 that is resident on the hard disk drive 710 to execute via the processor 705. This loads an operating system 753 into the RAM memory 706, upon which the operating system 753 commences operation. The operating system 753 is a system level application, executable by the processor 705, to fulfil various high level functions, including processor management, memory management, device management, storage management, software application interface, and generic user interface.

The operating system 753 manages the memory 734 (709, 706) to ensure that each process or application running on the computer module 701 has sufficient memory in which to execute without colliding with memory allocated to another process. Furthermore, the different types of memory available in the system 700 of FIG. 7A must be used properly so that each process can run effectively. Accordingly, the aggregated memory 734 is not intended to illustrate how particular segments of memory are allocated (unless otherwise stated), but rather to provide a general view of the memory accessible by the computer system 700 and how such is used.

As shown in FIG. 7B, the processor 705 includes a number of functional modules including a control unit 739, an arithmetic logic unit (ALU) 740, and a local or internal memory 748, sometimes called a cache memory. The cache memory 748 typically includes a number of storage registers 744-746 in a register section. One or more internal busses 741 functionally interconnect these functional modules. The processor 705 typically also has one or more interfaces 742 for communicating with external devices via the system bus 704, using a connection 718. The memory 734 is coupled to the bus 704 using a connection 719.

The application program 733 includes a sequence of instructions 731 that may include conditional branch and loop instructions. The program 733 may also include data 732 which is used in execution of the program 733. The instructions 731 and the data 732 are stored in memory locations 728, 729, 730 and 735, 736, 737, respectively. Depending upon the relative size of the instructions 731 and the memory locations 728-730, a particular instruction may be stored in a single memory location as depicted by the instruction shown in the memory location 730. Alternately, an instruction may be segmented into a number of parts each of which is stored in a separate memory location, as depicted by the instruction segments shown in the memory locations 728 and 729.

In general, the processor 705 is given a set of instructions which are executed therein. The processor 705 waits for a subsequent input, to which the processor 705 reacts to by executing another set of instructions. Each input may be provided from one or more of a number of sources, including data generated by one or more of the input devices 702, 703, data received from an external source across one of the networks 720, 702, data retrieved from one of the storage devices 706, 709 or data retrieved from a storage medium 725 inserted into the corresponding reader 712, all depicted in FIG. 7A. The execution of a set of the instructions may in some cases result in output of data. Execution may also involve storing data or variables to the memory 734.

The described arrangements use input variables 754, which are stored in the memory 734 in corresponding memory locations 755, 756, 757. The described arrangements produce output variables 761, which are stored in the memory 734 in corresponding memory locations 762, 763, 764. Intermediate variables 758 may be stored in memory locations 759, 760, 766 and 767.

Referring to the processor 705 of FIG. 7B, the registers 744, 745, 746, the arithmetic logic unit (ALU) 740, and the control unit 739 work together to perform sequences of micro-operations needed to perform "fetch, decode, and execute" cycles for every instruction in the instruction set making up the program 733. Each fetch, decode, and execute cycle comprises:

a fetch operation, which fetches or reads an instruction 731 from a memory location 728, 729, 730;

a decode operation in which the control unit 739 determines which instruction has been fetched; and an execute operation in which the control unit 739 and/or the ALU 740 execute the instruction.

Thereafter, a further fetch, decode, and execute cycle for the next instruction may be executed. Similarly, a store cycle may be performed by which the control unit 739 stores or writes a value to a memory location 732.

Each step or sub-process in the processes of FIGS. 2 to 6 is associated with one or more segments of the program 733 and is performed by the register section 744, 745, 747, the ALU 740, and the control unit 739 in the processor 705 working together to perform the fetch, decode, and execute cycles for every instruction in the instruction set for the noted segments of the program 733.

Figure 2:
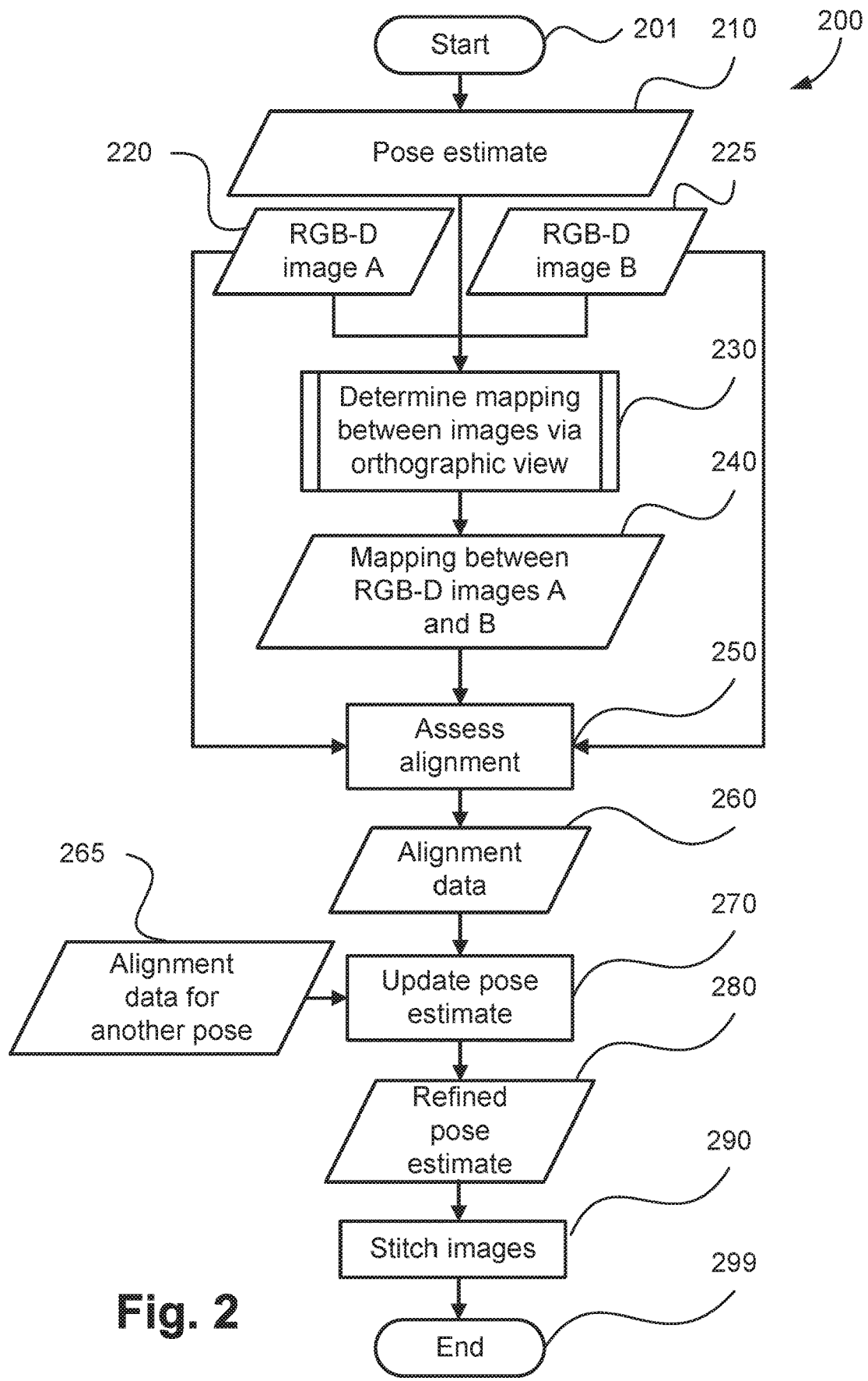
FIG. 2 is a schematic flow diagram illustrating a method of pose refinement.

The method of determining a pose of a camera may alternatively be implemented in dedicated hardware such as one or more integrated circuits performing the functions or sub functions of FIGS. 2 to 6. Such dedicated hardware may include graphic processors, digital signal processors, or one or more microprocessors and associated memories. The pose refinement can be performed according to a pose refinement method 200 shown in FIG. 2. The method 200 is typically implemented as one or more modules of the application 733, stored in the memory 706 and controlled under execution of the processor 705. The method 200 operates to determine or refine a pose of image capture devices such as the cameras 110 and 115. In the method of FIG. 2, alignment of two images is assessed using two images and a mapping between the images via an orthographic view.

The method 200 starts at a step 201. A pose estimate 210 for the two cameras (for example the cameras 110 and 115) is accessed, in addition to the two RGB-D images 220 and 225. The pose estimate 210 and the images 220 and 225 may be received directly from the cameras 110 and 115. Further, as the images 220 and 225 are RGB-D images, a depth map is associated with each image. Alternatively, the pose estimate 210 and the images 220 and 225 may be accessed from a memory such as the memory 706, or received via a network from a remote device such as a server computer.

As the method 200 commences the poses for both cameras are considered as the single pose estimate 210, as the poses may be parameterised in a coupled manner (i.e. involving both the cameras) corresponding to the physical arrangement of the cameras. The pose estimate 210 relates to an estimated location for each of the cameras 110 and 115. As discussed above, the spatial relationship between the cameras 110 and 115 is constrained based upon coupling of the cameras. For example, the first photogrammetry system 100 of FIG. 1A has cameras 110 and 115 having poses that differ significantly only along one axis. Accordingly, the application 733 may parameterise the coupled pose in terms of the distance between the two cameras 110 and 115 along the axis, as well as a reference position. Alternatively, the spatial relationship between the cameras 160 and 165 can be constrained in terms of both translation and rotation.

The method 200 continues under execution of the processor 705 to an image mapping determining step 230. Execution of the step 230 determines a mapping 240 from the first image 220 to the second image 225 by way of an orthographic view. A mapping relates coordinates from a source space onto a destination space. In the arrangements described, the source space is a coordinate space of the first image 220. The first image 220 is said to be moving, as applying a mapping (other than the identity mapping) will cause at least some region of the first image to change position. The destination space is determined by the mapping 240. In the arrangements described, the destination space is the coordinate space of the second image 225 according to the pose estimate 210. The second image 225 is said to be fixed, as the image 225 does not change when the mapping 240 is applied. If the pose estimate 210 is accurate, applying the mapping 240 to the first image 220 causes visible features (such as colours, edges and corners of a captured real-world object) of the resulting transformed first image to appear at the same coordinates as the respective features of the second image 225. In this event, the mapping 240 accordingly produces good alignment. If the pose estimate 210 is inaccurate, the destination space differs from the coordinate space of the second image. In this event, the mapping 240 accordingly produces misalignment. The mapping 240 may be specified using a coordinate transform matrix (such as a homography matrix) or a displacement field (a vector field that contains the coordinate offsets between matching pairs of coordinates in the two spaces). Step 230 operates to determine a mapping between the images 220 and 225 using the corresponding height maps, the camera pose 210 and a mapping of the second image 225 to an orthographic view. Further details of the image mapping step 230 are described hereinafter with reference to FIG. 3.

Mappings may be specified as either forward mappings or inverse mappings. Forward mappings are mappings from positions in the moving image to positions in the fixed image. Inverse mappings are mappings from positions in the fixed image to positions in the moving image. Forward mappings and inverse mappings are not applied in the same order. For example, applying a forward mapping from A to B and then a second forward mapping from B to C will produce a result of mapping from A to C. However to map from A to C using inverse mappings, first an inverse mapping from B to C is applied, and then an inverse mapping from A to B. Hereinafter forward mappings are used for ease of description, however the arrangements described can also be performed using inverse mappings.

The method 200 continues under execution of the processor 705 from step 230 to an alignment assessment step 250. Execution of the step 250 measures the alignment of the overlapping region of the first image 220 and the second image 225 according to the pose estimate 210. The overlapping region is preferably relatively small in size compared to the images 220 and 225, but can be substantially the same in size as the images 220 and 225. To measure the alignment of the overlapping region, the mapping 240 from the first image 220 to the second image 225 is applied to the first image 220, and Mutual Information is measured between the transformed first image and the second image 225. Accordingly, the application 733 determines alignment data between the image 220 transformed using the determined mapping 240 and the image 225. The alignment data is preferably determined with respect to the overlapping region only. In the context of the arrangements described, Mutual Information is a measure or score of pointwise statistical commonality between two images in terms of information theory. The colour information of each image is quantised independently into 256 colour clusters, for example by using the k-means algorithm, for the purposes of determining the Mutual Information. Each colour cluster is represented by a colour label, such as a unique integer per colour cluster in the image. The colour labels are the elements over which the Mutual Information is calculated. A Mutual Information measure I, also referred to as a mutual information score, for a first image containing a set of pixels associated with a set of labels A={$a_i$} and a second image containing a set of pixels associated with a set of labels B={$b_j$}, is defined as $$I = \sum_{i,j} P(a_i, b_j) \log_2 \left( \frac{P(a_i, b_j)}{P(a_i) P(b_j)} \right),$$ Equation (1)

In Equation (1) $P(a_i, j_b)$ is the joint probability value of the two labels $a_i$ and $b_j$ co-occurring at the same pixel position, $P(a_i)$ and $P(b_j)$ are the marginal probability distribution values of the respective labels $a_i$ and $b_j$, and $\log_2$ is the logarithm function of base 2. Further, i is the index of the label $a_i$ and j is the index of the label $b_j$. If the product of the marginal probability values $P(a_i)$ and $P(b_j)$ is zero (0), then the pixel pair is ignored.

In particular, one-dimensional histogram of labels in each image are used to calculate the marginal probabilities of the labels (i.e. $P(a_i)$ and $P(b_j)$), and a pairwise histogram of co-located labels are used to calculate the joint probabilities (i.e. $P(a_i, b_j)$).

The Mutual Information measure or score may be determined only for locations within the overlapping region (for example corresponding to the region 140 of FIG. 1A). The overlapping region is determined for example by creating a mask for the first image 220 and the second image 225, and applying the mapping 240 to the first image's mask. Applying the mapping produces a transformed first mask. Locations are only within the overlapping region, and thus considered for the probability distribution, if the locations are within the intersection of the transformed first mask and the second mask.

Alternatively, instead of creating a transformed first image, the probability distributions for the Mutual Information measure can be directly determined from the two images 220 and 225 and the mapping 240 using the technique of Partial Volume Interpolation, for example as described in F. Maes, A. Collignon, D. Vandermeulen, G. Marchal, and P. Suetens, "Multimodality Image Registration by Maximization of Mutual Information", IEEE Transactions on Medical Imaging, vol. 16. No. 2. pp. 187-198, 1997.

Determining the Mutual Information measure directly from the two images 220 and 225 and the mapping 240 avoids image interpoladon processing associated with creating a transformed first image where the mapping 240 involves subpixel displacements. Image interpolation processing cannot be directly applied to categorical data such as the colour labels. To implement image interpolation processing, a transformed and interpolated) first image is created, followed by colour clustering to create new categorical data for the transformed image. The Partial Volume Interpolation technique instead uses the colour labels for the first image 220. Therefore the colour clustering does not need to be recalculated for different mappings of the image. Further, colour interpolation processing may lead to biased shift estimation. As a transformed first image does not need to be created when using the Partial Volume Interpolation technique, no additional memory is required to store the transformed first image. Accordingly, using the Partial Volume Interpolation technique can be advantageous, avoiding the creation of a transformed image.

The Mutual Information measure (score) of two related images is typically higher when the two images are well aligned than when the two images are poorly aligned. The alignment assessment step 250 stores the Mutual Information measure for the transformed first image and the second image 225 as alignment data 260.

In some arrangements, techniques other than Mutual Information can be used to assess alignment at step 250. For example, correlation-based measures such as Normalised Cross Correlation (NCC) can be used to assess the alignment of the overlapping region. Similarly to the Mutual Information measure, the NCC measure (score) of two related images is typically higher when the two images are well aligned than when the two images are poorly aligned.

The alignment data 260 effectively represents a score or quality of the accuracy of the pose estimate 210. The alignment data 260 can be stored in the memory 706, for example. Step 250 effectively operates to determine an estimation quality of the pose estimate for the image capture devices that captured the first image (220) and second image (225).

The method 200 continues under execution of the processor 705 from step 250 to a pose estimate refinement step 270. Execution of the step 270 compares the alignment data 260 corresponding to the pose estimate 210 with alignment data 265 corresponding to at least one alternative pose estimate. According to an arrangements described, the alternative pose estimate is determined by an alternative pose estimation method other than the method used to determine the pose estimate 210. Some methods of estimating the pose are described above with reference to FIGS. 1A and 1B. Another method of estimating pose of a camera is used to determine an alternative pose estimate.

Execution of the pose estimate refinement step 270 selects the pose estimate indicative of improved alignment of overlapping regions. For example, the pose estimate producing a greater Mutual Information measure can be selected. The selected pose estimate is indicated in FIG. 2 as a refined pose estimate 280. Step 270 operates to determine the refined camera pose estimate 280 based on the determined alignment data 240 and the alignment data 265 associated with at least one other camera pose. The updated camera pose 280 can be used in stitching the images 220 and 225 at a stitching step 290. The stitching may be implemented using known methods of combining portions of images. The refined camera pose allows the stitching of the images to be more robust to errors in the initial camera pose 210.

According to another arrangement of the described methods, alternative pose estimates are determined iteratively using the Nelder-Mead method of optimisation. Using the Nelder-Mead method of optimisation, a set of prospective pose parameters is determined that corresponds to a simplex in pose parameter space. Each dimension of the pose parameter space corresponds to a dimension of the pose parameterisation. For example, one dimension of the pose parameter space for the first photogrammetry system 100 of FIG. 1A may be the distance between the two cameras 110 and 115 along the main axis. Each vertex of the simplex corresponds to a pose estimate. The initial simplex has a vertex corresponding to the initial pose estimate 210 and an additional vertex per dimension of the pose parameter space. Each of the additional vertices represents a variation away from the initial pose estimate 210 along a single corresponding dimension of the pose parameter space. Thus, each additional vertex has a position in parameter space corresponding to the initial pose estimate 210 plus an offset in the single corresponding dimension. The magnitude of each offset is set to half an expected variation in the corresponding dimension of the pose parameter space. Other offsets may be used, as the Nelder-Mead method of optimisation is robust with respect to starting conditions for many problems.

Each pose estimate corresponding to a vertex of the simplex is evaluated using the image mapping step 230 and the alignment assessment step 250 to produce alignment data for the pose estimate. When alignment data has been produced for each vertex of the simplex, the alignment data is tested for convergence. Convergence may be measured in terms of similarity of the pose parameters of the simplex vertices, or in terms of the similarity of the alignment data (e.g. Mutual Information measures) produced for the simplex vertices. The specific numerical thresholds for convergence depend on the pose accuracy requirements or processing time requirements of the photogrammetry system. Typically, stricter convergence requirements produce better pose accuracy, but require more optimisation iterations to achieve. As an indicative starting point, an alignment data similarity threshold of 1e-6 (that is, $10^{-6}$) may be used to define convergence. On the first iteration (i.e. for the initial simplex), convergence is not achieved.

If convergence is achieved, the pose estimate indicative of the best alignment of overlapping regions is selected as the refined pose estimate 280. Otherwise, if convergence is not achieved, a transformed simplex representing a further set of prospective pose parameters is determined using the alignment data 260, and the pose estimates are likewise evaluated as a subsequent iteration. Accordingly, a sequence of simplexes traverses parameter space to determine a refined pose estimate. To ensure the optimisation method terminates, a maximum number of simplexes may be generated, at which point the pose estimate indicative of the best alignment of overlapping regions is selected as the refined pose estimate 280.

The refined cameras pose 280 is based upon a constrained spatial relationship between cameras capturing the images 220 and 225, for example the coupling of the cameras 110 and 115. The determination of the refined pose estimate 280 and the stitching step 290 denotes the end of the pose refinement method 200, indicated as 299. In some arrangements, the refined camera pose may be stored for use in stitching images at a higher level process and the step 290 excluded.

Figure 3:
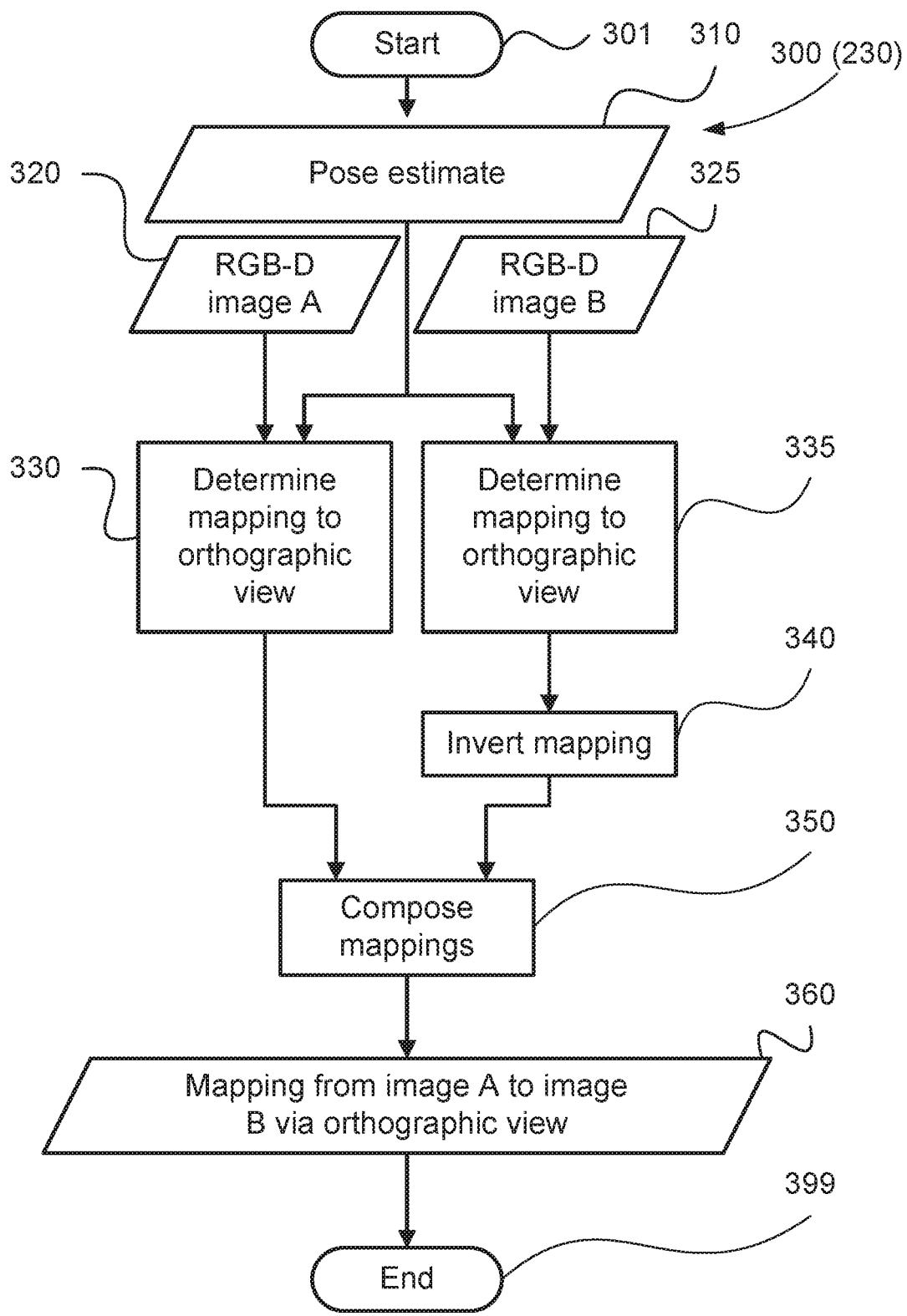
FIG. 3 is a schematic flow diagram illustrating a method of determining a mapping from an image to another image via an orthographic view as used in the methods of FIG. 2 and FIG. 5.

The method 200 can be executed iteratively. For example, the mapping 240 can be an initial mapping, the alignment data 260 initial alignment data, and the refined camera pose 280 an initial refined camera pose. The step 230 can be repeated using both of the images 220 and 225 to determine a current mapping, followed by the step 250 to determine current alignment data, and the step 270 to determine a refined pose estimate. The initial alignment data can be used as part of the alignment data 265. FIG. 3 shows a method 300 of determining a mapping from an image to another image, as implemented at the image mapping step 230. The method 300 is typically implemented as one or more modules of the application 733, stored in the memory 706 and controlled under execution of the processor 705.

At the start of the image mapping method 300, indicated as 301, a pose estimate 310, a first RGB-D image 320 and a second RGB-D image 325 are provided. The pose estimate 310 relates to the pose estimate 210, and the images 320 and 325 relate to the images 220 and 225 respectively. The method 300 executes a first orthographic mapping determining step 330 to determine a mapping, also referred to as an orthographic transform, from the first image 320 to an orthographic view. According to one arrangement of the described methods, the mapping is a homography. The homography is represented by a 3×3 matrix having nine entries but only eight degrees of freedom due to non-unique scale. The homography matrix is determined by identifying four non-collinear points on the object plane and the four corresponding points on the image plane (for example, a camera sensor plane or a viewing plane). Given the two corresponding sets of four non-collinear coplanar points, the homography matrix is generated by determining a first transform from the unit square onto each set of points, inverting the first transform, and composing the second transform with the inverted transform, for example as described in Section 2.2.3 of *Fundamentals of Texture Mapping and Image Warping*, Paul Heckbert, Master's thesis, UCB/CSD 89/516, CS Division, U.C. Berkeley, June 1989. The first RGB-D image 320 and the second RGB-D image 325 are each tested for having approximately constant depth information, by checking that the trimmed depth range is constrained (for example, 90th percentile of depth<1.1× 10th percentile of depth). The images 320 and 325 are tested using the associated height maps. If the depth information is not approximately constant, then an alternative mapping approach (using displacement fields instead of homographies, described below) is used instead. If the depth information is approximately constant, the object plane is designated as lying along the z=0 plane, and the unit square points (0, 0, 0), (1, 0, 0), (1, 1, 0) and (0, 1, 0) are selected from the object plane. The selected unit square points are projected using the pose associated with the first RGB-D image 320 from the pose estimate 310 onto an image plane, and the associated homography is a mapping to an orthographic view projecting along the z axis. Step 330 accordingly executes to determine a first mapping from the first image 320 to an orthographic view along a first axis using the associated height map of the image 320 and the associated camera pose 310. However if the object is not perfectly planar, there will be some residual parallax distortion in the orthographic view where the object surface deviates from the object plane used. The step 330 effectively determines coordinates in a space to form the orthographic view.

In a similar manner, the method 300 executes a second orthographic mapping determining step 335 and determines a mapping from the second image 325 to an orthographic view, using the pose associated with the second image 325 instead of the pose associated with the first image 320. Due to the coupled pose parameterisation, the orthographic view projects along the same z axis as did the orthographic view of the first orthographic mapping determining step 330. In some arrangements, the steps 330 and 335 can be executed simultaneously in parallel. In other arrangements step 330 can be executed prior to step 335, or vice versa.

If the pose estimate 310 is accurate and there is no present unresolved distortion (such as uncorrected intrinsic distortion or residual parallax), the overlapping region of the two orthographic views should have corresponding coordinates for the same object surface positions throughout the region. However, an inaccurate pose estimate will impart some misalignment in the overlapping region of the orthographic views determined at step 335 and 340.

The method 300 continues under execution of the processor 705 from step 335 to a mapping inversion step 340. Execution of the step 340 inverts the mapping from the second image 325 to an orthographic view, to produce a mapping from an orthographic view to the second image. In arrangements where the mapping is a homography, step 340 is performed by inverting the homography matrix. The method 300 proceeds under execution of the processor 705 from the steps 330 and 340 to a mapping composition step 350 to determine a composition of the first and second mappings. Execution of the step 350 composes the mapping from the first image 320 to an orthographic view with the inverted mapping (that is the mapping from an orthographic view to the second image 325 generated at step 340). In arrangements where the mappings are homographies, the composition is performed by multiplying the two homography matrices. A resulting composed mapping 360 maps from the first image 320 to the second image 325 according to the pose estimate 310 and the depth information of the images. The creation of the composed mapping 360 signifies the end of the image mapping method 300, as indicated by 399. The steps 330 and 335 use the height or depth maps associated with each of the images 320 and 325. Accordingly, the method 300 operates to determine the mapping 360 between the images 320 and 325 using the pose estimate 310, height (or depth) maps associated with the images, and a mapping of the image 325 to an orthographic view.

According to another arrangement, the mappings of the image mapping method 300 are displacement fields. The use of displacement fields instead of homographies allows for handling of depth-dependent displacements (parallax) in non-planar objects. The first orthographic mapping calculation step 330 determines a displacement field mapping from the first image 320 to an orthographic view by determining an inverse projection using the pose estimate 310 and the depth information of the first image. The inverse projection is determined by inverting the projection from the real-world object onto the image plane. The pose associated with the first image 320 is determined from from the pose estimate 310, and is given by a transformation matrix T and a nominal object distance $z_0$ from the first camera:

$$T = \begin{pmatrix} r_a & r_b & r_c & t_x \\ r_d & r_e & r_f & t_y \\ r_g & r_h & r_i & t_z \\ 0 & 0 & 0 & 1 \end{pmatrix} \quad \text{Equation (2)}$$

In Equation (2), T is a transformation matrix using homogeneous coordinates comprising a rotation submatrix $$\begin{pmatrix} r_a & r_b & r_c \\ r_d & r_e & r_f \\ r_g & r_h & r_i \end{pmatrix}$$

and a translation subvector $$\begin{pmatrix} t_x \\ t_y \\ t_z \end{pmatrix}$$

indicating the pose of the first camera (for example the camera 110). The pose 310 describes the relationship of the first camera's coordinate system to the object's coordinate system. The projection P from the object onto the image plane is given by Equations (3) to (6):

$$\begin{pmatrix} x' \\ y' \\ z' \\ 1 \end{pmatrix} = T \begin{pmatrix} x \\ y \\ z \\ 1 \end{pmatrix} \quad \text{Equation (3)}$$

$$p_x = \frac{x' z_0}{z' + z_0} \quad \text{Equation (4)}$$

$$p_y = \frac{y' z_0}{z' + z_0} \quad \text{Equation (5)}$$

$$d = z' + z_0 \quad \text{Equation (6)}$$

The projection P is determined such that $(p_x, p_y, d) = P(T, z_0, x, y, z)$, where $$\begin{pmatrix} x \\ y \\ z \\ 1 \end{pmatrix}$$

is a homogeneous coordinate representing a location on the real-world object's surface; x, y and z are orthogonal real-world dimensions with z as the axis of orthographic projection; $p_x$ and $p_y$ are the horizontal and vertical pixel coordinate respectively of the location $$\begin{pmatrix} x \\ y \\ z \\ 1 \end{pmatrix}$$

projected onto the image plane. Additionally, d is the the depth information describing the distance from the image plane to the object surface for the pixel coordinate $(p_x, p_y)$. Next, the inverse projection is applied to the $(p_x, p_y, d)$ coordinates of the first image 320. Applying the inverse projection causes the $(p_x, p_y, d)$ coordinate of each pixel of the first image 320 to be transformed to a corresponding (x, y, z) position on the real-world object's surface. In aggregate the (x, y, z) positions form a point cloud. Each point of the point cloud is associated with the corresponding "absolute" $(p_x, p_y)$ image coordinate, and an associated "relative" displacement is calculated as $(x, y)-(p_x, p_y)$. The aggregate relative displacements form the displacement field mapping from the first image 320 to an orthographic view.

In a similar manner, the second orthographic mapping calculation step 335 determines a displacement field mapping from the second image 325 to an orthographic view, using the pose and depth information associated with the second image 325 instead of the pose and depth information associated with the first image 320.

After execution of step 335, the mapping inversion step 340 inverts the displacement field mapping from the second image 325 to an orthographic view, to produce a displacement field mapping from an orthographic view to the second image. The displacement field mapping is inverted by finding $(p_x, p_y)$ coordinates on the image plane, typically having fractional components, that correspond with integer-valued (x, y) coordinates on the real-world object's surface. To invert the displacement field mapping, first the displacement field is converted from relative displacements to absolute-form $(p_x, p_y)$ coordinates. Newton's method is applied to the absolute-form displacement field, solving for integer-valued (x, y) values in the absolute-form displacement field. The corresponding z coordinate is also determined using interpolation, and where multiple solutions of $(p_x, p_y)$ coordinates for the same (x, y) coordinate are found, the $(p_x, p_y)$ coordinate solution having corresponding z coordinate closest to the orthographic viewpoint is selected. For each selected $(p_x, p_y)$ coordinate solution, an associated relative displacement is calculated as $(p_x, p_y)-(x, y)$. The aggregate relative displacements form the inverted displacement field mapping from an orthographic view to the second image.

The mapping composition step 350 composes the displacement field mapping from the first image 320 to an orthographic view with the inverted displacement field mapping (i.e. the mapping from an orthographic view to the second image 325). The mappings are applied one after another, and the two relative displacements from each starting coordinate are vector summed to produce a composed relative displacement, according to $$M_{12}(p_x,p_y)=M_{1O}(p_x,p_y)+M_{O2}((p_x,p_y)+M_{1O}(p_x,p_y))\quad\text{Equation (7)}$$

In Equation (7), $M_{1O}$ is the mapping from the first image to an orthographic view, $M_{O2}$ is the inverted mapping. In other words, from an orthographic view to the second image, $M_{12}$ is the resulting composed mapping 360 from the first image to the second image, x and y are coordinates of the image plane, and + denotes vector (component-wise) addition. The creation of the composed mapping 360 signifies the end of the image mapping method 300.

Figure 4:
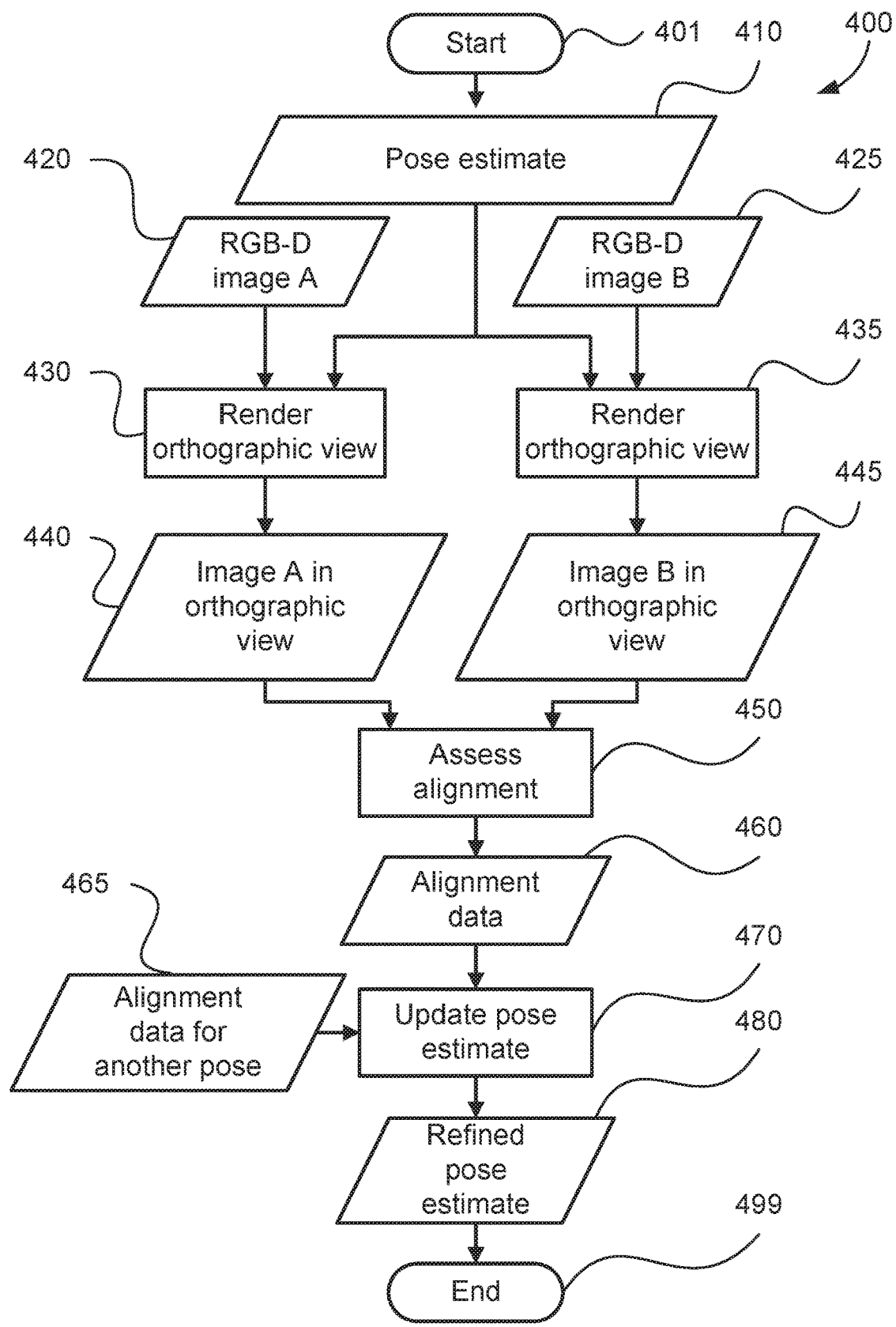
FIG. 4 is a schematic flow diagram illustrating another method of pose refinement.

The method 200 determines a camera pose based upon alignment of a mapping between images via an orthographic view. Alternatively, the pose may be refined or determined by comparing the overlapping region in the respective orthographic views of the two RGB-D images. FIG. 4 shows an orthographic view comparison pose refinement method 400. The method 400 is typically implemented as one or more modules of the application 733, stored in the memory 706 and controlled under execution of the processor 705. In execution of FIG. 4, alignment is assessed using two images that are rendered in an orthographic view.

As the method 400 starts, as indicated at 401, a pose estimate 410, a first RGB-D image 420 and a second RGB-D image 425 are provided or accessed. The pose estimate 410 relates to the pose estimate 210, and the images 420 and 425 relate to the images 220 and 225 respectively. The method 400 progresses to a first orthographic view rendering step 430. Execution of the step 430 determines a mapping from the first image 420 to an orthographic view using the pose estimate 410. The method 430 operates to determine the mapping according to the first orthographic mapping determining step 330 of FIG. 3. Returning to FIG. 4, the mapping is applied to the first image 420 to produce a first orthographic view image 440. Similarly, the method 400 operates to execute a second orthographic view step 435 using the image 425 to produce a second orthographic view image 445.

Upon completion of steps 440 and 445, the method 400 continues under execution of the processor 705 to an alignment assessment step 450. Execution of step 450 measures alignment of the overlapping region of the first image 420 and the second image 425 according to the pose estimate 410 by measuring the Mutual Information between the first orthographic view image 440 and the second orthographic view image 445. The measured Mutual Information measure is stored as alignment data 460. The alignment data 460 indicates a quality or score of the camera pose estimate 410 using the rendered orthographic views 440 and 445 of the images 420 and 425. Step 250 of the method 200 relates to comparison of images in the coordinate space of one of the images using a mapping via an orthographic view. In contrast, the step 450 relates to comparison of images rendered to an orthographic view.

The method 400 continues under execution of the processor 705 to a pose estimate refinement step 470. Execution of the step 470 compares the alignment data 460 corresponding to the pose estimate 410 with alignment data 465 corresponding to at least one alternative pose estimate, as described above with reference to step 270 of FIG. 2. Execution of the step 470 produces a refined pose estimate 480, after which the method 400 ends, as indicated by 499. The refined pose estimate is determined based on the alignment data 465.

Alternatively, the pose may be refined by comparing two different mappings between the images, one of the mappings being a residual-corrected mapping that involves a residual mapping between orthographic views.

Figure 5:
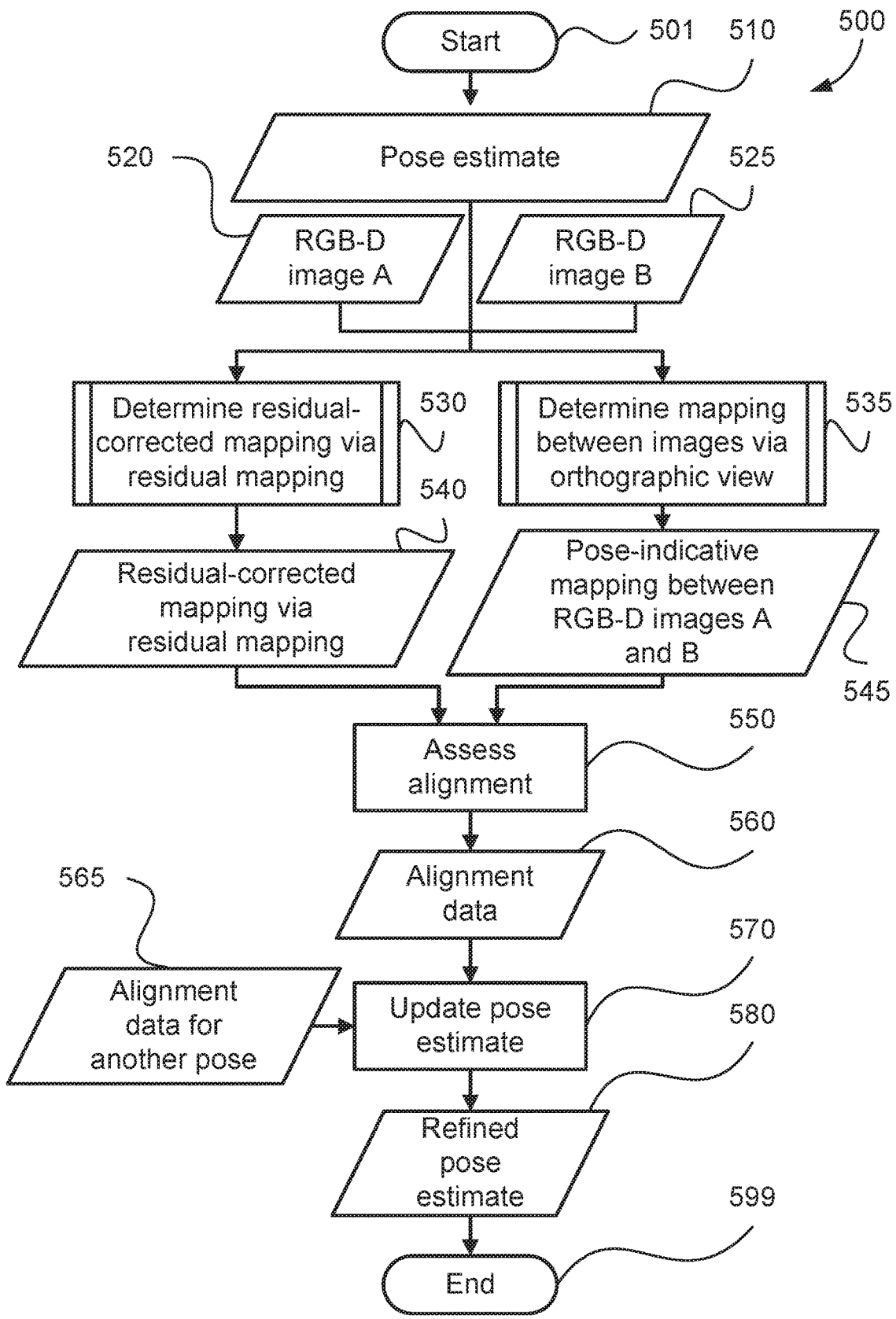
FIG. 5 is a schematic flow diagram illustrating a further method of pose refinement.

FIG. 5 shows a mapping comparison pose refinement method 500. The method 500 is typically implemented as one or more modules of the application 733, stored in the memory 706 and controlled under execution of the processor 705. The method 500 relates to determining a camera pose where alignment is assessed using two mappings from a first image to a second image, one of the mappings being a residual-corrected mapping involving a residual mapping.

At the start of the method 500, indicated by 501, a pose estimate 510, a first RGB-D image 520 and a second RGB-D image 525 are provided or accessed. The pose estimate 510 relates to the pose estimate 210, and the images 520 and 525 relate to the images 220 and 225 respectively. The method 500 proceeds to a residual-corrected mapping determining step 530. Execution of the step 530 determines a mapping from the first image 520 to the second image 525 using a residual mapping, as described below with reference to FIG. 6.

Figure 6:
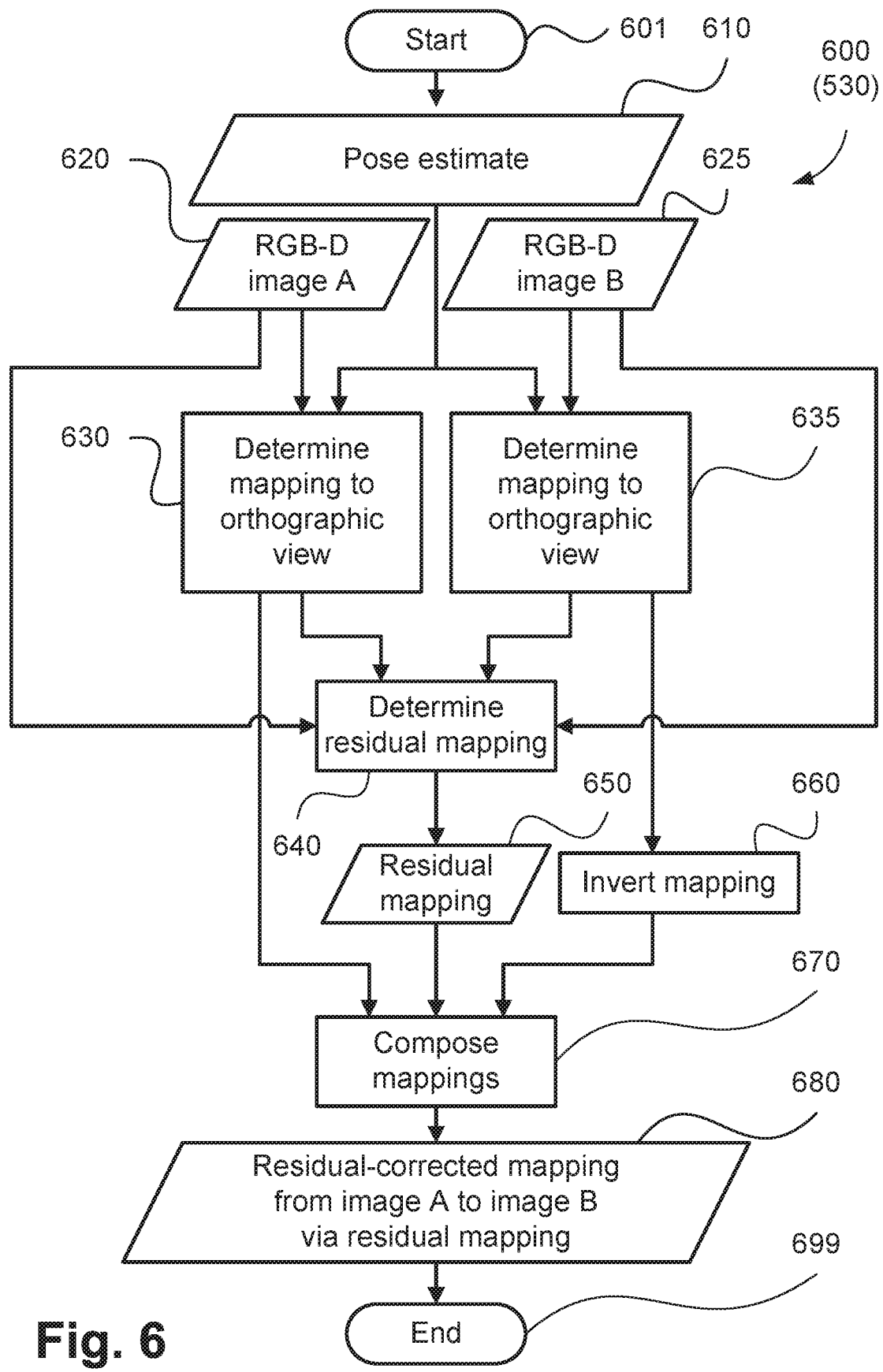
FIG. 6 is a schematic flow diagram illustrating a method of determining a residual-corrected mapping from an image to another image involving a residual mapping as used in the method of FIG. 5.

FIG. 6 shows a residual-corrected mapping determination method 600. The method 600 reflects steps taken in execution of the step 530. The method starts, as indicated at 601, by accessing a pose estimate 610, a first RGB-D image 620 and a second RGB-D image 625. The pose estimate 610 relates to the pose estimate 510, and the images 620 and 625 relate to the images 520 and 525 respectively. The method 600 progresses to a first orthographic mapping determining step 630. The step 630 determines a mapping from the first image 620 to an orthographic view as was described with reference to the first orthographic mapping calculation step 330 of FIG. 3. In a similar manner, the method 600 executes a second orthographic mapping calculation step 635 to determine a mapping from the second image 630 to an orthographic view. Steps 630 and 635 effectively operate to respectively determine coordinates in a space for the first image 620 and the second image 625. The steps 630 and 635 can be executed sequentially in any order or in parallel.

Once the steps 630 and 635 have been completed, the method 600 continues under execution of the processor 705 to a residual mapping determination step 640. Execution of the step 640 applies the respective mappings to orthographic views (determined at 630, 635) to the respective images (620 and 625), to produce respective orthographically projected images. The orthographically projected images align the overlapping region according to the pose estimate 610, but there may be remaining misalignment (for example, arising due to errors in the pose estimate). The residual mapping determination 640 step determines a mapping from the first orthographically projected image to the second orthographically projected image. The resulting mapping is referred to as a residual mapping, indicated as 650 in FIG. 6. The residual mapping 650 operates to substantially align the orthographically projected images. The residual mapping describes the remaining misalignment between the orthographic images.

In one arrangement, the residual mapping 650 is a homography. In another arrangement, the residual mapping 650 is calculated by determining a displacement field between the orthographically projected images, and then by fitting a homography to the displacement field. The resulting homography is the residual mapping 650. The displacement field can be determined using a Mutual Information measure to fit B-splines to each region of a regular grid, and then determining pixel-wise displacements using the B-splines. An example of a method using B-splines is described in S. Klein, M. Staring, K. Murphy, M. A. Viergever, J. P. W. Pluim, "elastix: a toolbox for intensity based medical image registration," IEEE Transactions on Medical Imaging, vol. 29, no. 1, January 2010 at pages 196-205. Alternatively the displacement field can be determined using a dense optical flow method. An example of a dense optical flow method is described in Gunnar Farnebäck, "Two-Frame Motion Estimation Based on Polynomial Expansion"; In Proceedings of the 13th Scandinavian Conference on Image Analysis, Gothenburg, Sweden, 2003 at pages 363-370. The displacement field may be determined using only information that is located within the overlapping region. A homography is fit to the displacement field using a least-squares error measure. The resulting mapping is stored as the residual mapping 650.

Typically, if the pose estimate 610 is accurate, the orthographically projected images will be relatively well aligned, and the residual mapping 650 will be similar to the identity mapping (the mapping that does not cause a change of coordinates). If the pose estimate 610 is less accurate, the orthographically projected images will be less well aligned, and the residual mapping 650 represent greater coordinate displacements.

The method 600 also proceeds to a mapping inversion step 660 upon completing the step 635. The step 660 inverts the mapping from the second image 625 to an orthographic view, to produce a mapping from an orthographic view to the second image, in a manner described with reference to the mapping inversion step 340 of FIG. 3. The step 640 and 660 may be executed sequentially or in parallel.

Once steps 640 and 660 are completed, the method 600 proceeds to a mapping composition step 670 to determining a residual-corrected mapping from the first image 620 to the second image 625 using the camera pose 610 and the determined residual mapping 650. Execution of the step 670 composes the mapping from the first image 620 to an orthographic view, the residual mapping 670, and the inverted mapping determined at step 660 (the mapping from an orthographic view to the second image 625). The mappings are applied one after another to produce a residual-corrected mapping 680 from the first image 620 to the second image 625 by way of the residual mapping 650. The creation of the residual-corrected mapping 680 results in the end of the residual-corrected mapping determination method 600, as indicated by 699.

Referring again to FIG. 5, the mapping produced by the residual-corrected mapping determination step 530 is stored as a residual-corrected mapping 540. The method 500 also executes an image mapping step 535. The step 535 determines a mapping from the first image 520 to the second image 525 by way of an orthographic view but without using a residual mapping, as described above with reference to the image mapping method 300 of FIG. 3. The resulting mapping reflects the geometric relationship of the images according to the pose estimate 510, and is stored as a pose-indicative mapping 545. The steps 530 and 535 may be executed sequentially in any order, or in parallel.

Each of the steps 230, 430, 435, 530 and 535 relate to projecting or mapping first and second images to an orthographic view. The arrangements described accordingly generally relate to determining mappings of the first image and the second image to an orthographic view using height maps from RGB-D images and an estimated camera pose.

Upon completion of the steps 530 and 535, the method 500 continues under execution of the processor 705 to an alignment assessment step 550. The step 550 compares the residual-corrected mapping 540 with the pose-indicative mapping 545, in contrast to operation of the steps 250 and 450. The residual-corrected mapping 540 is a mapping that causes good alignment between the images, and the pose-indicative mapping 545 is a mapping reflecting the pose estimate 510. If the pose estimate 510 is accurate, then the pose-indicative mapping 545 will be similar to the residual-corrected mapping. In an arrangement where the, the mappings 540 and 545 are homographies, the dissimilarity between the mappings is expressed by $$d(M_1, M_2) = \left\| \begin{pmatrix} a_1 & b_1 & \frac{t_{x1}}{w} \\ c_1 & d_1 & \frac{t_{y1}}{h} \\ p_1*w & q_1*h & 1 \end{pmatrix} - \begin{pmatrix} a_2 & b_2 & \frac{t_{x2}}{w} \\ c_2 & d_2 & \frac{t_{y2}}{h} \\ p_2*w & q_2*h & 1 \end{pmatrix} \right\|, \quad \text{Equation (8)}$$

In Equation (8), $d(M_1, M_2)$, also referred to as a dissimilarity measurement, is the dissimilarity between the two mappings $M_1$ and $M_2$. The parameters a, b, c, d, p, q, $t_x$ and $t_y$ are homography matrix entries at the corresponding locations of the two mappings, w is the width of the first image, h is the height of the first image, − is elementwise subtraction, and the ∥ operator calculates the Frobenius norm (the square root of the sum of squared values of the matrix entries). The dissimilarity between the residual-corrected mapping and the pose-indicative mapping is stored as alignment data 560. The dissimilarity is compared against an alignment data similarity threshold of 1e-6 ($10^{-6}$) used to define convergence.

Steps 250, 450 and 550 each generate alignment data, reflecting an estimation quality of respective initial pose estimates 210, 410 and 510. The steps 250, 450 and 550 generate the estimate quality using different methods relating to orthographic projections or mappings for two images. For example, step 250 compares images in the coordinate space of one of the images using a mapping via an orthographic view, step 450 compares images rendered to an orthographic view, and step 550 compares a mapping and a residual-corrected mapping that uses a residual mapping to describe the remaining misalignment between orthographic views.

The method 500 continues under execution of the processor 705 from step 550 to a pose estimate refinement step 570. Execution of the step 570 compares the alignment data 560 corresponding to the pose estimate 510 with alignment data 565 corresponding to an alternative pose estimate. The step 570 determines a camera pose using the residual-corrected mapping to reduce discrepancies between orthographic projections of the images 520 and 525 while maintaining the residual-corrected mapping determined at step 530.

The step 570 is performed similarly to the pose estimate refinement step 270 described with reference to FIG. 2. However, the same residual-corrected mapping 540 can be reused for each pose being tested. The method 500 operates to determine the residual-corrected mapping 540 and determine a camera pose based on the residual-corrected mapping 540. In order to implement iterative pose estimation, only the pose-indicative mapping 545 needs be determined for each pose. The steps 550 and 570 can be repeated to determine a further refined pose estimate using the residual-corrected mapping and a further mapping.

To determine the further mapping, a candidate pose is selected using Nelder-Mead optimisation based on the dissimilarity measure. For each selected candidate camera pose a further mapping is determined as a mapping from the first image to the second image. The mapping from the first image to the second image for a particular candidate camera pose can be determined, for example, using the method 300. As such, the mapping from the first image to the second image can be determined using a mapping of the first image to an orthographic view and an inverse mapping of the second image to an orthographic view, with both mappings to an orthographic view being determined using the candidate camera pose. The mappings to an orthographic view can be further determined using respective height maps. In one embodiment, each mapping to an orthographic view is determined by determining a homography using the candidate camera pose. The further mapping is compared with the residually-corrected mapping, for example, using the dissimilarity as described in Equation (8). The the dissimilarity measure is used to guide optimisation in the Nelder-Mead method to optionally select a further candidate pose. Once the dissimilarity measure satisfies the alignment data similarity threshold of 1e-6 ($10^{-6}$), the candidate pose is selected as the further refined pose estimate. Effectively, a candidate pose is selected using a dissimilarity measure between the residual-corrected mapping and a mapping from the first image to the second image associated with a previous candidate camera pose Advantageously for an arrangement whereby the mappings are homographies, the image mapping step 535 only uses the two images to determine an indicative object plane based on the depth information of each image. The indicative object plane can also be reused for each pose being tested. Therefore the pose indicative mapping 545 can be determined without accessing the two images for subsequently tested poses. The pose refinement step 570 selects a refined pose estimate 580. After the step 570, the pose refinement method 500 ends, as indicated by 599. Using the dissimilarity measurement of Equation (8) with the determined residual-corrected mapping and a homography mapping from step 535, the method 500 can operate iteratively at a relatively increased speed. While use of displacement fields rather than homographies for the mappings 530 and 535 may operate at relatively lower speed, the method 500 nonetheless can provide an advantage over previous methods of improved alignment and stitching of images.

The arrangements described are applicable to the computer and data processing industries and particularly for the image processing industries.

The arrangements described are particularly suitable for image stitching applications to reproduce an accurate image of a real-world object. For example, the methods refine the camera pose for a pair of RGB-D images given a pose estimate. The described methods utilise mappings to orthographic views to mitigate parallax distortion. Further, the described methods utilise dense correspondences throughout the overlap region, advantageously enabling pose refinement where weak texture gradients may cause difficulties for feature-point matching approaches.

One of the methods 200, 400 and 500 can be used for stitching first and second RGB-D images of an object, for example an oil painting for example. The alignment data determined can be used to adjust a pose of one or more of the cameras so that the alignment data between the first and second images is improved. A resultant stitched image of the object will accordingly relate to improved alignment in relation to 2D and 3D features. The arrangements described effectively use a 3D transform estimate such as a displacement field or a homography and assess correctness of the transforms using 2D alignment. The methods described do not require advance knowledge of objects in the image, or models of the objects. Implementations using a homography as the mapping between orthographic images can be relatively computationally simple and fast, particularly in relation to the method of FIG. 5. Implementations using a displacement field are particularly suited to stitching images of 2.5D or 3D objects, as parallax errors can be addressed.

The foregoing describes only some embodiments of the present invention, and modifications and/or changes can be made thereto without departing from the scope and spirit of the invention, the embodiments being illustrative and not restrictive.

The invention claimed is:

1. A method of determining a camera pose, the method comprising:
    receiving a first image and a second image, the first and second images being associated with a camera pose, a height map for pixels and a color map for pixels in each corresponding image;
    determining a mapping between the height map of the first image and the height map of the second image using the camera pose and a mapping of the height map of the second image to an orthographic view;
    determining alignment data between the color map of the first image transformed using the determined mapping and the color map of the second image; and
    determining a refined camera pose based on the determined alignment data and alignment data associated with at least one other camera pose.

2. The method according to claim 1, wherein the determined mapping is an initial mapping, the alignment data is initial alignment data, and the refined camera pose is an initial refined camera pose, the method further comprising:
    determining a current mapping between the first image and the second image using height maps and the initial refined camera pose, the current mapping, the current mapping determined using a mapping of at least one of the first image and the second image to an orthographic view;
    determining current alignment data using the current mapping; and
    comparing the determined alignment data to the initial alignment data to determine a current refined camera pose.

3. The method according to claim 1, wherein the determined mapping is a homography matrix.

4. The method according to claim 1, wherein the determined mapping is a displacement field.

5. The method according to claim 1, wherein determining the mapping comprises:
    determining a first mapping from the first image to an orthographic view using the associated height map and the associated camera pose;
    determining a second mapping from the second image to an orthographic view using the associated height map and the associated camera pose;
    inverting the second mapping to determine a composition of the first and second mappings as the mapping between the first image and the second image.

6. The method according to claim 1, wherein determining alignment data comprises determining a mutual information score based on the first image, the second image and the determined mapping between the first image and the second image.

7. The method according to claim 1, wherein determining the refined camera pose is based on a constrained spatial relationship between cameras capturing the first and second images.

8. The method according to claim 1, wherein the alignment data is determined based on a probability of labels co-occurring in pixels of the first image transformed using the determined mapping and the second image.

9. The method according to claim 1, further comprising using the refined camera pose in stitching the first and second images.

10. A method of determining a camera pose, the method comprising:
receiving a first image, a second image, each of the first and second images being associated with a corresponding height map, a corresponding color map and a camera pose;
determining coordinates in a space for pixels of each of the first and second images, the coordinates being determined using the corresponding height maps and the camera pose to form an orthographic view;
determining a residual mapping substantially aligning the orthographic views corresponding to the corresponding color maps of the first and second images;
determining a residual-corrected mapping from the corresponding height map of the first image to the corresponding height map of the second image using the camera pose and the determined residual mapping; and
determining a refined camera pose using the residual-corrected mapping to reduce discrepancies between the orthographic views.

11. The method according to claim 10, further comprising a step of determining a further mapping between the first image and the second image using at least one candidate camera pose, wherein the refined camera pose is determined using the residual-corrected mapping and the further mapping.

12. The method according to claim 11, further comprising repeating the step of determining a further mapping for a further candidate camera pose, and determining the refined camera poses using the residual-corrected mapping and each of the further mappings.

13. The method according to claim 10, wherein the refined camera pose is determined based upon a dissimilarity measurement between the residual-corrected mapping and a mapping between the first and second images for a candidate camera pose.

14. The method according to claim 10, wherein the residual-corrected mapping relates to a homography matrix.

15. The method according to claim 10, wherein the residual-corrected mapping relates to a displacement field, the method further comprising fitting a homography to the displacement field.

16. The method according to claim 10, wherein determining the residual-corrected mapping comprises, composing the coordinates in the space for pixels of the first image, an inverse of the coordinates in the space for pixels of the second image, and the residual mapping.

17. The method according to claim 10, further comprising:
selecting a candidate pose using a dissimilarity measure between the residual-corrected mapping and a mapping from the first image to the second image associated with a previous candidate camera pose;
determining a further mapping from the first image to the second image using the candidate pose, wherein the further mapping is determined using a mapping of the first image to an orthographic view and a mapping of the second image to an orthographic view; and
comparing the further mapping and the residual-corrected mapping to determine the refined camera pose.

18. A method of determining a camera pose, the method comprising:
receiving a first image and a second image, the received images being associated with a camera pose, a height map for pixels and a color map for pixels in each corresponding image;
determining mappings of the height map of the first image and the height map of the second image to an orthographic view using the height maps and the camera pose;
determining alignment data using the color map of the first image, the color map of the second image and the determined mappings; and
determining a refined camera pose based on the determined alignment data and a camera pose estimation quality associated with at least one other camera pose.

19. A non-transitory computer-readable medium having a program stored thereon for determining a camera pose, the program comprising:
code for receiving a first image and a second image, the first and second images being associated with a camera pose, a height map for pixels and a color map for pixels in each corresponding image;
code for determining a mapping between the height map of the first image and the height map of the second image using the camera pose and a mapping of the height map of the second image to an orthographic view;
code for determining alignment data between the color map of the first image transformed using the determined mapping and the color map of the second image; and
code for determining a refined camera pose based on the determined alignment data and alignment data associated with at least one other camera pose.

20. Apparatus configured to:
receive a first image, a second image, the first and second images being associated with a corresponding height map, a corresponding color map and a camera pose;
determine coordinates in a space for pixels of each of the first and second images, the coordinates being determined using the corresponding height maps and the camera pose to form an orthographic view;
determine a residual mapping substantially aligning the orthographic views corresponding to the corresponding color maps of the first and second images;
determine a residual-corrected mapping from the corresponding height map of the first image to the corresponding height map of the second image using the camera pose and the determined residual mapping; and
determine a refined camera pose using the residual-corrected mapping to reduce discrepancies between the orthographic views.

21. A system, comprising:
a camera;
a memory for storing data and a computer readable medium;
a processor coupled to the memory for executing a computer program, the program having instructions for:
receiving a first image and a second image captured by the camera, the received images being associated with a camera pose, a height map for pixels and a color map for pixels in each corresponding image;

determining mappings of the height map of the first image and the height map of the second image to an orthographic view using the height maps and the camera pose;

determining alignment data using the color map of the first image, the color map of the second image and the determined mappings; and determining a refined camera pose based on the determined alignment data and a camera pose estimation quality associated with at least one other camera pose.

* * * * *